United States Patent [19]
Abe et al.

[11] Patent Number: 5,870,158
[45] Date of Patent: Feb. 9, 1999

[54] LIQUID CRYSTAL DISPLAY AND ELECTRONIC APPARATUS

[75] Inventors: Akira Abe, Miyagi-ken; Hyunho Shin, Sendai, both of Japan

[73] Assignee: Alps Electric Co., Ltd., Tokyo, Japan

[21] Appl. No.: 3,255

[22] Filed: Jan. 6, 1998

[30] Foreign Application Priority Data

Jan. 8, 1997 [JP] Japan .................................... 9-001733

[51] Int. Cl.$^6$ ................................................ G02F 1/1333
[52] U.S. Cl. .................................................. 349/111
[58] Field of Search ............................................. 349/111

[56] References Cited

U.S. PATENT DOCUMENTS 5,459,596  10/1995  Ueda et al. ............................. 349/111

FOREIGN PATENT DOCUMENTS 07301814  11/1995  Japan .

Primary Examiner—William L. Sikes
Assistant Examiner—James Dudek
Attorney, Agent, or Firm—Brinks Hofer Gilson & Lione

[57] ABSTRACT

A liquid crystal display capable of freely changing between the state of having a large viewing angle and the state of having a small viewing angle according to one's need, and an electronic apparatus using the liquid crystal display. A pair of substrates having respective surfaces opposed to each other are provided and a liquid crystal is provided between the substrates. A common electrode and an alignment film are successively formed on the opposed surface of one of the pair of substrates. A multiplicity of pixel electrodes are provided on the opposed surface of the other substrate so as to cover display regions of the liquid crystal. An electroconductive black matrix is provided on the other substrate while being electrically insulated from the pixel electrodes, the black matrix being formed at peripheral portions of the pixel electrodes and over non-display regions of the liquid crystal. Another alignment film is provided over the pixel electrodes and the black matrix. A switch is provided to divide a pixel region formed corresponding to each pixel electrode into two by applying a potential to the black matrix. The switch changes the two pixel regions formed corresponding to each pixel electrode into one when no potential is applied to the black matrix.

8 Claims, 14 Drawing Sheets

Vseg = 5.5V
Vcom = VB/M = GRD

A : UPPER SUBSTRATE RUBBING DIRECTION

B : LOWER SUBSTRATE RUBBING DIRECTION

AREA OF CR≧10

LIQUID CRYSTAL DISPLAY AND ELECTRONIC APPARATUS

BACKGROUND OF THE INVENTION

1. Field of the Invention

The present invention relates to an image display apparatus capable of selectively increasing or reducing the viewing angle, and an electronic apparatus using the image display apparatus.

2. Description of the Related Art

FIG. 16 shows the structure of an example of a liquid crystal display, designated by H. The liquid crystal display H has a liquid crystal 3 in a twisted nematic (TN) mode interposed between a pair of substrates 1 and 2 facing each other, and polarizing plates 4 and 5 disposed outside the substrates 1 and 2. If the liquid crystal display H is of a thin film transistor type, it is arranged to enable orientation control of the liquid crystal 3 as described below. A source wiring 6 and a gate wiring 7 are provided in a matrix form on one substrate 1. A thin film transistor 8 and a pixel electrodes are provided in a region corresponding to each of intersections of the source wiring 6 and the gate wiring 7. A color filter 10 and a common electrode 11 are provided on the other substrate 2. A potential difference is created between the pixel electrode 9 in each region and the common electrode 11 opposed to the pixel electrode 9 to apply the desired electric field to the liquid crystal 3 between the two electrodes.

In this type of liquid crystal display H, for orientation control of liquid crystal molecules when no electric field is applied, alignment films (not shown) are respectively provided on the pair of substrates 1 and 2 on the liquid crystal sides of the same. The alignment film on the substrate 1 placed under the substrate 2 as viewed in FIG. 16 is rubbed in the direction of arrow B shown in FIG. 17 while the alignment film on the substrate 2 is rubbed in the direction of arrow A shown in FIG. 17.

In the liquid crystal display H having the structure shown in FIG. 16, therefore, liquid crystal molecules homogeneously oriented parallel to the upper and lower substrates 1 and 2 have a twist of 90° between the substrates 1 and 2 when no electric field is applied to the liquid crystal 3. When an electric field is applied to the liquid crystal 3, the liquid crystal molecules are oriented along the direction of the electric field perpendicularly to the substrates. Passage or stoppage of light from a backlight provided under the lower substrate 1 is selected by changing the liquid crystal in this manner, thus enabling the display to be changed between a bright state and a dark state.

Recently, viewing angle dependence of TN liquid crystal display devices of this kind has been taken into consideration. FIG. 18 shows an ordinary viewing angle dependence of a TN mode liquid crystal display. The hatched area in FIG. 18 represents a display area where the contrast ratio (CR) is 10 or higher. As can be clearly understood from FIG. 18, the visibility of the TN mode liquid crystal display is not low when the display is viewed at an angle along the horizontal direction but the visibility is considerably low when the display is viewed at an angle along the vertical direction, particularly at an angle from a higher position.

Under these circumstances, various structures for increasing the liquid crystal viewing angle have been proposed.

As a conventional technique for increasing the viewing angle of a liquid crystal display device of the above-described kind, an orientation division structure for divided orientation of the pixel unit is known. In this orientation division structure, domains where liquid crystal molecules rise in different directions when a voltage is applied are formed in each of pixel regions. Ordinarily, in this kind of structure, each pixel is divided into two and orientation is performed in different manners with respect to the divided two pixel regions. This orientation division structure has reduced and symmetrized steep changes in contrast in TN mode liquid crystal displays, which are considerably large and are exhibited asymmetrically about an angle along the vertical direction. An effect of increasing the area free from half tone gradation reversal has been achieved thereby, which substantiates the possibility that a liquid crystal display having a sufficiently wide viewing angle will be provided.

The inventors of the present invention have achieved the present invention noticing that, in some case, it is preferable to reduce the viewing angle of a liquid crystal display, and that, in some other case, it is preferable to increase the viewing angle of the liquid crystal display.

SUMMARY OF THE INVENTION

In view of the above-described circumstances, an object of the present invention is to provide a liquid crystal display capable of freely changing between the state of having a large viewing angle and the state of having a small viewing angle according to one's need, and an electronic apparatus using the liquid crystal display.

To achieve this object, according to one aspect of the present invention, there is provided a liquid crystal display comprising a pair of substrates having respective surfaces opposed to each other, a liquid crystal provided between the pair of substrates, a common electrode and an alignment film successively formed on the opposed surface of one of the substrates, a multiplicity of pixel electrodes provided on the opposed surface of the other of the substrates so as to cover display regions of the liquid crystal, an electroconductive black matrix provided on the other of the substrates while being electrically insulated from the pixel electrodes, the black matrix being formed at peripheral portions of the pixel electrodes and over non-display regions of the liquid crystal, another alignment film provided over the pixel electrodes and the black matrix, and changing means for dividing a pixel region formed corresponding to each of the multiplicity of pixel electrodes into two when the changing means applies a potential to the black matrix, the changing means changing the two pixel regions formed corresponding to each of the multiplicity of pixel electrodes into one when the changing means applies no potential to the black matrix.

The changing means is provided to enable the display to be changed so as to select one of the one-domain pixel region and the two-domain pixel region. If the one-domain pixel region is set, the display can be used in a state of having a narrow viewing angle. If the two-domain region is set, the display can be used in a state of having a wide viewing angle. Thus, the wide viewing angle state and the narrow viewing angle state can be arbitrarily changed by the changing means to use the display in the selected viewing angle state according to a purpose. For example, if it is desirable to view the display in a wide viewing range from different peripheral positions, the wide viewing angle state is selected by the changing means. If a user uses the display with secrecy from those around the user, it is preferable for the user to select the narrow viewing angle state. Domains hereinafter referred to are regions in each of which liquid crystal molecules are oriented in accordance with the same orientation rule.

More specifically, the above-described structure may be such that the black matrix and the common electrode are electrically connected to each other by the changing means. Also, a potential may be applied to the black matrix and the common electrode freely selectively to maintain the black matrix and the common electrode in an equipotential state.

If the black matrix and the common electrode are electrically connected to be maintained in an equipotential state, each pixel can be reliably divided into two domains, thus achieving an effect of reducing and symmetrizing steep and asymmetric changes in contrast along a vertical direction by reliably dividing each pixel region into two domains so that the area free from half tone gradation reversal is increased.

The arrangement of the present invention may be such that the liquid crystal comprises a TN mode liquid crystal, the rubbing direction of the alignment film provided on the one of the substrates and the rubbing direction of the alignment film provided on the other of the substrates are in a 90° twisted state, and the rubbing direction of the alignment film on the above-mentioned one of the two substrates is set so that the rubbing direction of the alignment film on the other substrate is 90° twisted clockwise relative to the rubbing direction of the alignment film provided on the above-mentioned one of the substrates, thus achieving an effect of reducing and symmetrizing steep and asymmetric changes in contrast along a vertical direction by reliably dividing each pixel region into two so that the area free from half tone gradation reversal is increased.

According to another aspect of the present invention, there is provided an electronic apparatus comprising a pair of substrates having respective surfaces opposed to each other, a liquid crystal provided between the pair of substrates, a common electrode and an alignment film successively formed on the opposed surface of one of the substrates, a multiplicity of pixel electrodes provided on the opposed surface of the other of the substrates so as to cover display regions of the liquid crystal, an electroconductive black matrix provided on the other of the substrates while being electrically insulated from the pixel electrodes, the black matrix being formed at peripheral portions of the pixel electrodes and over non-display regions of the liquid crystal, another alignment film provided over the pixel electrodes and the black matrix, and changing means for dividing a pixel region formed corresponding to each of the multiplicity of pixel electrodes into two when the changing means applies a potential to the black matrix, the changing means changing the two pixel regions formed corresponding to each of the multiplicity of pixel electrodes into one when the changing means applies no potential to the black matrix.

The changing means is provided to enable the display to be changed so as to select one of the one-domain pixel region and the two-domain pixel region. If the one-domain pixel region is selected, the display can be used in a state of having a narrow viewing angle. If the two-domain region is selected, the display can be used in a state of having a wide viewing angle. Thus, it is possible to provide an electronic apparatus in which the wide viewing angle state and the narrow viewing angle state can be arbitrarily changed by the changing means to use the display in the selected viewing angle state according to a purpose. For example, if it is desirable to view the display in a wide viewing range from different peripheral positions, the wide viewing angle state is selected by the changing means. If a user uses the apparatus with secrecy from those around the user, it is preferable for the user to select the narrow viewing angle state.

More specifically, the above-described structure may be such that the black matrix and the common electrode are electrically connected to each other by the changing means. Also, a potential may be applied to the black matrix and the common electrode freely selectively to maintain the black matrix and the common electrode in an equipotential state.

If the black matrix and the common electrode are electrically connected to be maintained in an equipotential state, each pixel can be reliably divided into two domains, thus achieving an effect of reducing and symmetrizing steep and asymmetric changes in contrast along a vertical direction by reliably dividing each pixel region into two domains so that the area free from half tone gradation reversal is increased.

The arrangement of the present invention may be such that the liquid crystal comprises a TN mode liquid crystal, the rubbing direction of the alignment film provided on the one of the substrates and the rubbing direction of the alignment film provided on the other of the substrates are in a 90° twisted state, and the rubbing direction of the alignment film on the above-mentioned one of the two substrates is set so that the rubbing direction of the alignment film on the other substrate is 90° twisted clockwise relative to the rubbing direction of the alignment film provided on the above-mentioned one of the substrates, thus achieving an effect of reducing and symmetrizing steep and asymmetric changes in contrast along a vertical direction by reliably dividing each pixel region into two so that the area free from half tone gradation reversal is increased.

DESCRIPTION OF THE PREFERRED EMBODIMENTS

Preferred embodiments of the present invention will be described below with reference to the accompanying drawings.

Figure 1:
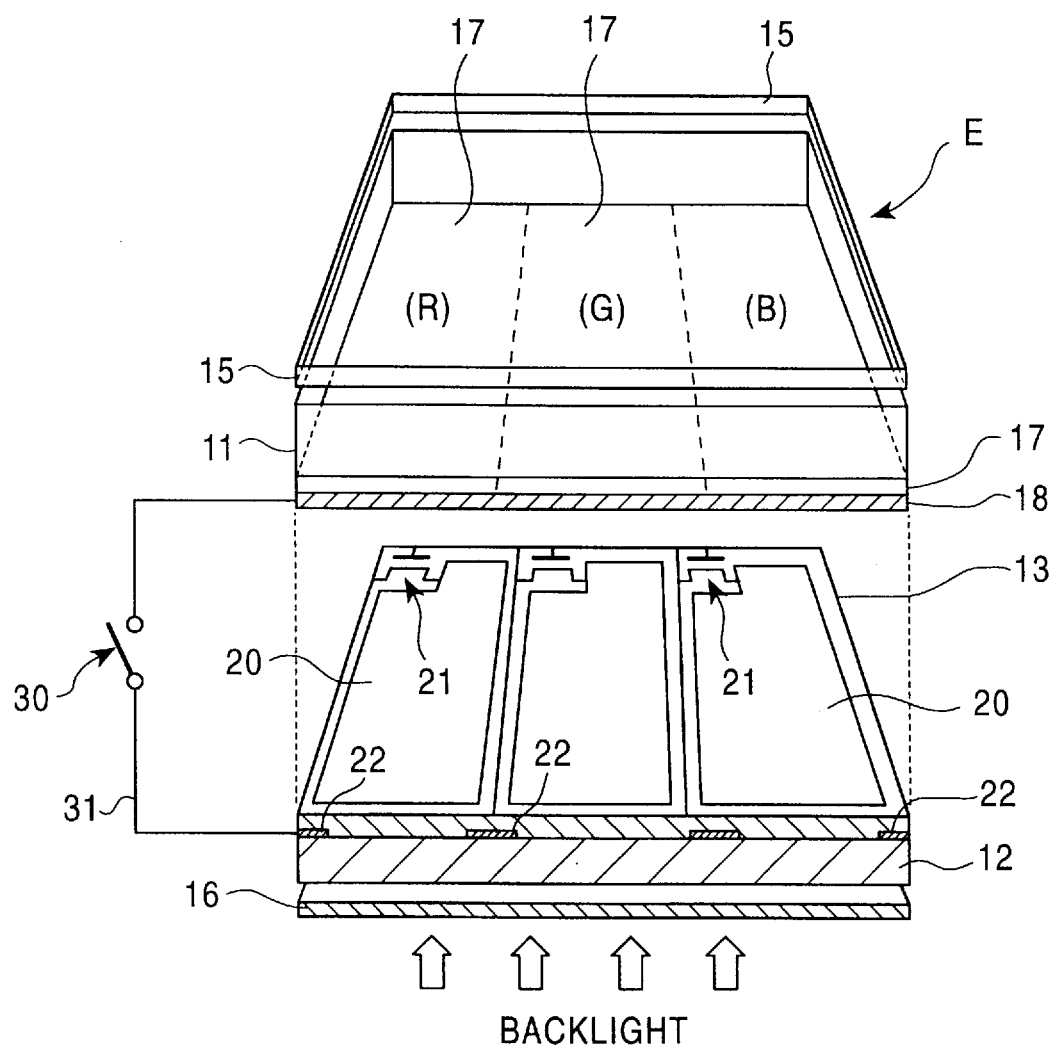
FIG. 1 is a schematic exploded perspective view partly in section of a liquid crystal display in accordance with the present invention.
Figure 2:
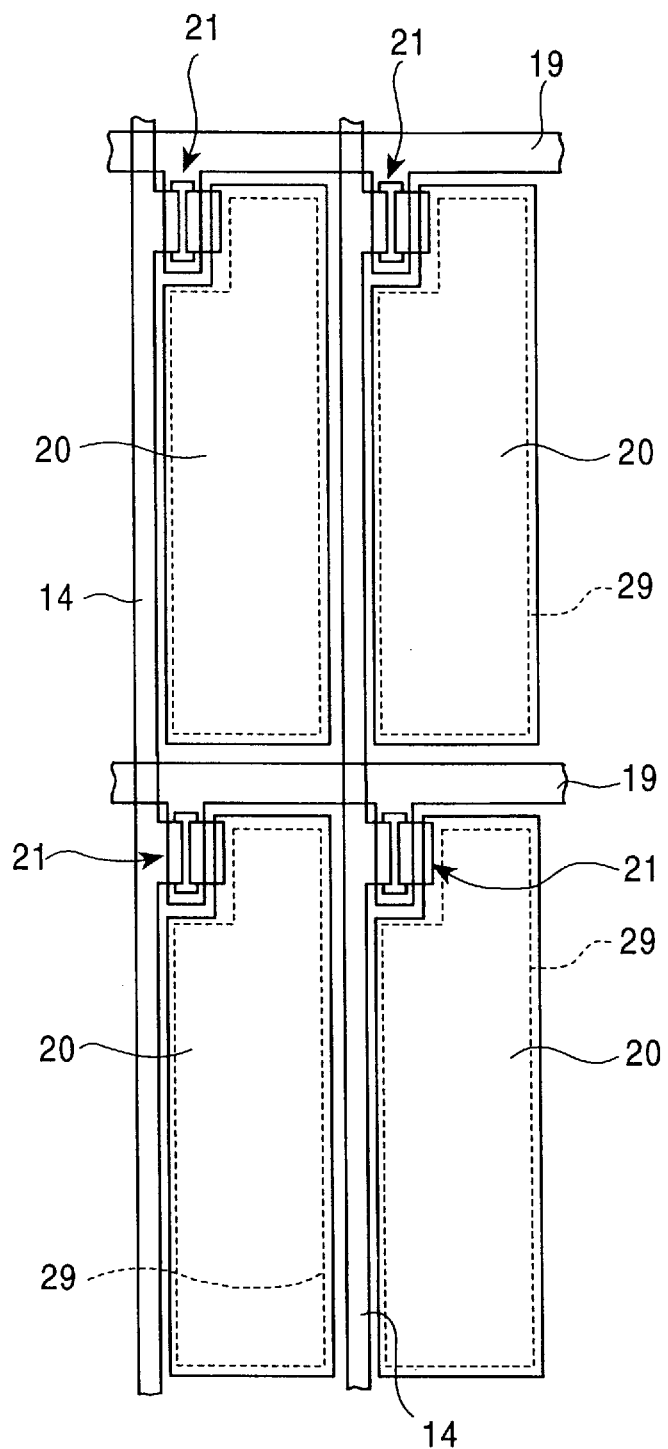
FIG. 2 is a plan view of the layout of source and gate wirings, thin film transistors and pixel electrodes in the liquid crystal display shown in FIG. 1.
Figure 3:
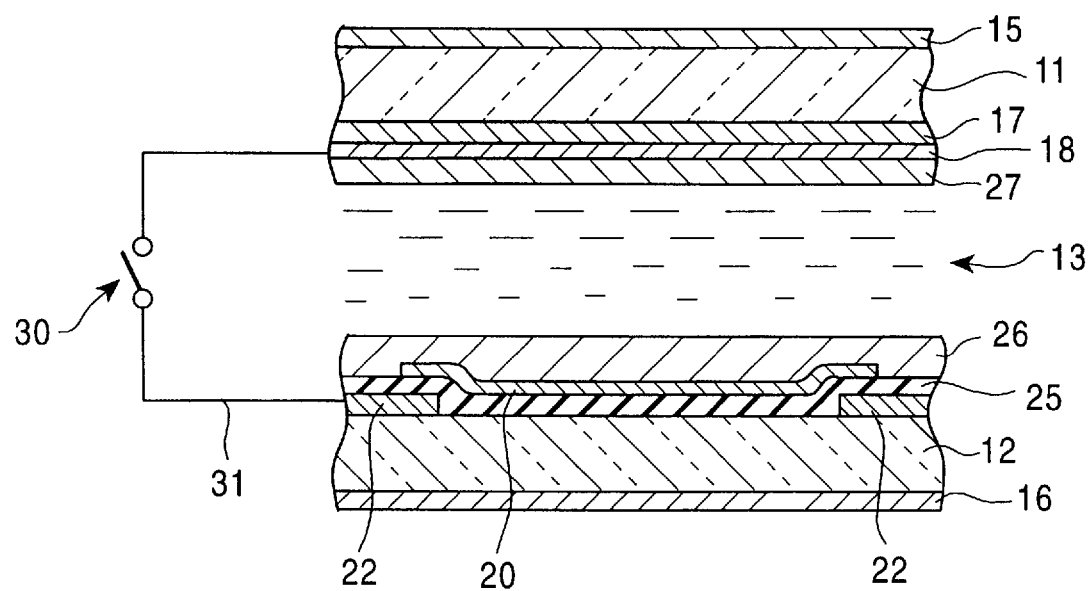
FIG. 3 is a schematic partially sectional view of the liquid crystal display shown in FIG. 1.

Referring to FIGS. 1 to 3, a liquid crystal display E in accordance with the present invention has a liquid crystal 13 in a TN mode provided between a pair of transparent substrates 11 and 12, which are disposed in upper and lower positions as viewed in the figures so as to face each other with a predetermined cell gap formed therebetween. A polarizing plate 15 is provided on the upper surface of the upper substrate 11 while a polarizing plate 16 is provided on the lower surface of the lower substrate 12. A color filter 17 and a common electrode 18 are laminated on the liquid crystal 13 side of the upper substrate 11. A source wiring 14 and a gate wiring 19 arranged in the form of a matrix are provided on the liquid crystal 13 side of the lower substrate 12. A pixel electrode 12 formed of a transparent electroconductive material such as indium tin oxide (ITO) is provided in each of regions surrounded by the source and gate wirings. A thin film transistor 21 provided as a switching element to which the source and gate wirings 14 and 19 are connected is connected to each pixel electrode 20.

In FIG. 1, only three pixel regions in a multiplicity of pixel regions provided in the liquid crystal display E are illustrated. However, pixel electrode 20 is provided for each pixel of the liquid crystal display E, and a filter of one of three primary colors, red (R), green (G) and blue (B) is placed on each pixel, thus forming a color filter 17.

A black matrix 22 is formed on the upper surface of the substrate 12 and at peripheral portions of the pixel electrodes 20, as shown in FIG. 3. The black matrix 22 is provided for the purpose of concealing non-display regions, including source wiring portions, gate wiring portions and thin film transistor portions, which do not contribute to display using the liquid crystal. The black matrix 22 is formed of an electroconductive film of a metal such as Cr or Mo having a light shielding property. In the metal film forming the black matrix 22, a plurality of through holes 29 each having such a shape as to be slightly smaller than the contour of the pixel electrode 20 are formed at regular intervals while being positioned in alignment with the pixel electrode 20. As shown in FIG. 3, the pixel electrodes 20 are provided on the black matrix 22 with insulating film 25 interposed therebetween. The shape of the through hole 29 formed while being positioned in alignment with the pixel electrodes 20 is as indicated by the broken line in FIG. 2. The areas surrounded by the broken lines in FIG. 2 correspond to display regions through which light can pass while the area outside the areas surrounded with the regions surrounded by the broken lines corresponds to the non-display regions through which light cannot pass (source wiring 14, gate wiring 19, the thin film transistors and regions on the periphery of these elements).

An alignment film 26 is formed over the pixel electrodes 20 on the lower substrate 12 to be in contact with the liquid crystal 13 while an alignment film 27 is formed on the liquid crystal side of the electrode layer 18 on the upper substrate 11. The rubbing direction of the alignment film 26 on the lower substrate 12 coincides with the direction of arrow B shown in FIG. 4 while the rubbing direction of the alignment film 27 on the upper substrate 11 coincides with the direction of arrow A' shown in FIG. 4. The direction of arrow B and the direction of arrow A' shown in FIG. 4 correspond to a downward and rightward direction and a downward and leftward direction, respectively, with respect to the viewing direction in which a user using the liquid display E views the display from a position in front of the substrates 11 and 12.

In this embodiment, the black matrix 22 and the common electrode 18 are connected to each other by a connection line 31 in which a switch (changing means) 30 is inserted. Connection or disconnection of the black matrix 22 and the common electrode 18 can be selected by turning on or off the switch 30. In FIGS. 1 and 3, the black matrix 22, the common electrode 18 and the connection line 31 are illustrated as if the connection line 31 is simply connected to portions of the black matrix 22 and the common electrode 18. In the liquid crystal display actually constructed, however, the liquid crystal 13 is enclosed in the space between the substrates 11 and 12 with a sealing material surrounding the liquid crystal 13 at the peripheral ends of the substrates 11 and 12. Actually, therefore, an end portion of the black matrix 22 and an end portion of the common electrode 18 are extended to positions on the periphery of the sealing portion, and the extended portions, not shown in FIGS. 1 and 3, are connected by the connection line 31.

Other elements and connections, not shown in the figures, are also provided. Integrated circuits for driving through the source wiring 14 and the gate wiring are mounted around the substrates 11 and 12, the common electrode 18 is grounded, and the black matrix 22 is in a floating state when it is not connected to the common electrode 18.

In the liquid crystal display E of this embodiment, when the switch 30 is turned off, the black matrix 22 and the common electrode 18 are disconnected from each other to set the black matrix 22 in the floating state while the common electrode 18 is in the grounded state. When the switch 30 is turned on, the black matrix 22 and the common electrode 18 are electrically connected to each other to set both the black matrix 22 and the common electrode 18 in the grounded equipotential state. Thus, one of these two conditions can be selected.

In the liquid crystal display E of this embodiment, the display method is the same as that for ordinary liquid crystal displays, and resides essentially in changing between the state where an electric field is applied between the pixel electrodes 20 and the common electrode 18 and the state where no electric field is applied. When no electric field is applied to the liquid crystal, liquid crystal molecules existing between the substrates 11 and 12 are in a 90° twisted state between the rubbing direction of the alignment film 26 on the lower substrate (the direction B shown in FIG. 4) and the rubbing direction of the alignment film 27 on the upper substrate (the direction A' shown in FIG. 4). Under this condition, light of the backlight passing through the lower polarizing plate 16 is polarized to be able to pass through the upper polarizing plate 15, thus effecting a bright display. When an electric field is applied to the liquid crystal, the liquid crystal molecules are set perpendicular to the substrates 11 and 12. In this state, therefore, light from the backlight is shut off by the polarizing plates 16 and 15, thus effecting a dark display.

Figure 18:
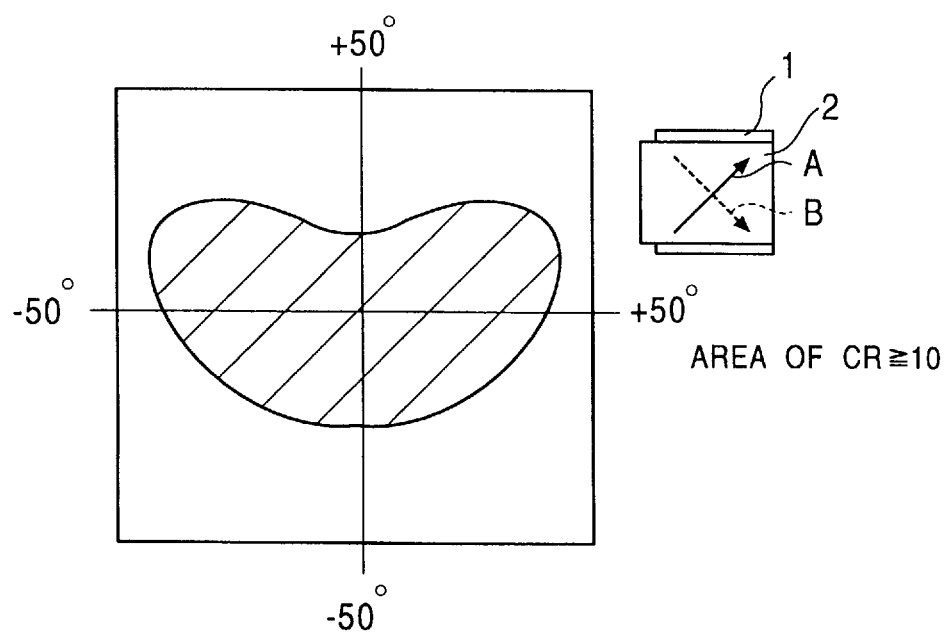
FIG. 18 is a diagram showing an equicontrast curve in the conventional liquid crystal display.

While the display is being operated by being changed between the bright and dark states as described above, the viewing angle can be changed by operating the switch 30, as described below. When the operating switch 30 is turned off to disconnect the black matrix 22 and the common electrode 18, the black matrix 22 and the common electrode 18 are set in the floating state and the grounded state, respectively. In this situation, the liquid crystal molecules existing in the pixel regions are orientation-controlled so as to be uniform in each pixel region (one pixel region is formed of one domain), thereby enabling the liquid crystal to be set in the bright or dark state in the same manner as in the conventional liquid crystal display. As a result, the viewing angle is the same as that in the conventional liquid crystal display shown in FIG. 18.

Figure 4:
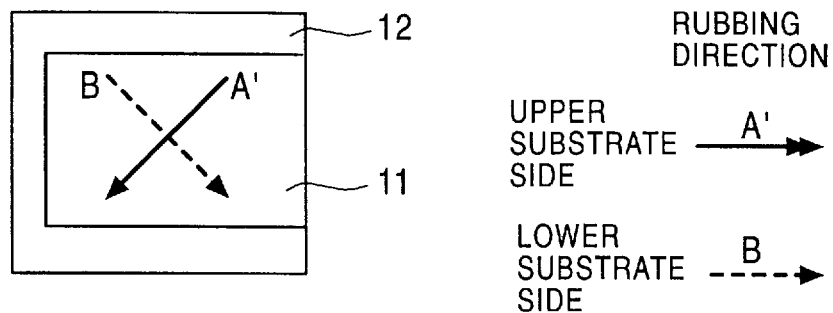
FIG. 4 is a schematic plan view of a first example of rubbing directions in the liquid crystal display shown in FIG. 1.

When the switch 30 is turned on to electrically connect the black matrix 22 and the common electrode 18, each of the black matrix 22 and the common electrode 18 is set in the grounded state. Each pixel region is thereby divided into two domains. If the rubbing directions of the upper and lower alignment films 11 and 12 are predetermined as shown in FIG. 4, two domains can be formed so that the discrimination line indicating the boundary between the two domains in each pixel region extends along a diagonal direction of the rectangular shape of the pixel region. Thus, each pixel region can be divided into two domains, so that steep changes in contrast in TN mode liquid crystal displays, which are considerably large and are exhibited asymmetrically about an angle along the vertical direction, are reduced and symmetrized, and an effect of increasing the area free from half tone gradation reversal is achieved, thus making it possible to obtain a wide viewing angle characteristic.

As described above, in the liquid crystal display of this embodiment, the electrically connected state and the disconnected state of the black matrix 22 and the common electrode 18 are changed by operating the switch 30; if the black matrix 22 is grounded, each pixel region is divided into two domains to set the display in a wide viewing angle state; and, if the black matrix 22 is set in the floating state, each pixel region is formed of one domain and the display is set a narrow viewing angle state. Thus, the display can be freely changed between the wide viewing angle state and the narrow viewing angle state by operating the switch 30. In a case where an information item relating to one's privacy or a secret, of which prevention from being seen by those around a user is preferred, is being displayed, the user may operate the switch 30 to set the display in the narrow viewing angle state. At the time of display of a kind of information which may be openly displayed, the display may be set in the narrow viewing angle state.

In the above-described embodiment, the black matrix 22 is provided on the lower substrate 12 and the pixel electrodes 20 are provided above the black matrix 22. However, another structure is possible in which pixel electrodes 20 are formed on the lower substrate 12 and a black matrix is formed above the pixel electrodes 20 with an insulating layer interposed therebetween.

FIGS. 5 and 6 show other examples of rubbing directions of the alignment film 26 on the lower substrate 12 and the alignment film 27 on the upper substrate 11 used in the liquid crystal display E in accordance with the present invention.

Figure 5A:
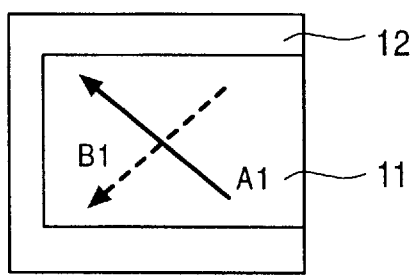
FIGS. 5A through 5C are schematic plan views of second to fourth examples of rubbing directions in the liquid crystal display shown in FIG. 1.
Figure 5B:
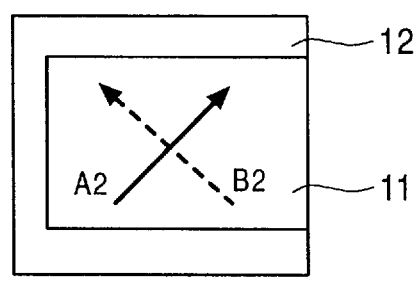
Figure 5C:
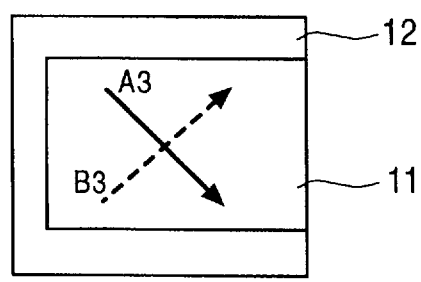

FIG. 5A shows an example in which, upon setting rubbing directions along diagonal directions of the substrates 11 and 12, the rubbing direction of the alignment film 27 on the upper substrate side is set as indicated by arrow $A_1$ (in an upward and leftward direction as viewed in the normal viewing direction to the substrates) and the rubbing direction of the alignment film 26 on the lower substrate side is set as indicated by arrow $B_1$ (in a downward and leftward direction as viewed in the normal viewing direction to the substrates). FIG. 5B shows an example in which rubbing directions are set by turning the two rubbing directions of FIG. 5A clockwise by 90° (as directions $A_2$ and $B_2$), and FIG. 5C shows an example in which rubbing directions are set by turning the two rubbing directions of FIG. 5B clockwise by 90° (as directions $A_3$ and $B_3$).

Figure 6A:
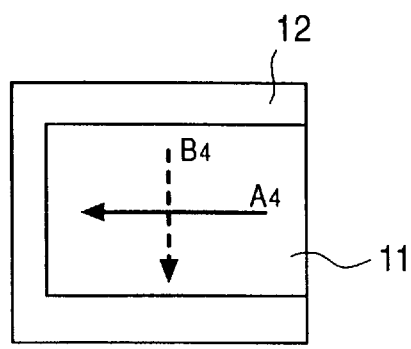
FIGS. 6A through 6D are schematic plan views of fifth to eighth examples of rubbing directions in the liquid crystal display shown in FIG. 1.
Figure 6B:
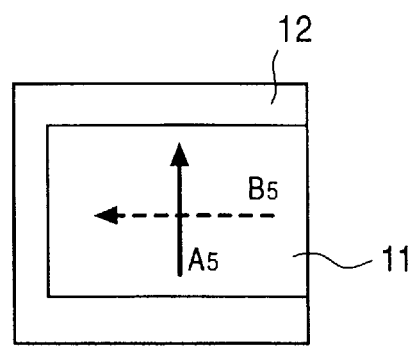
Figure 6C:
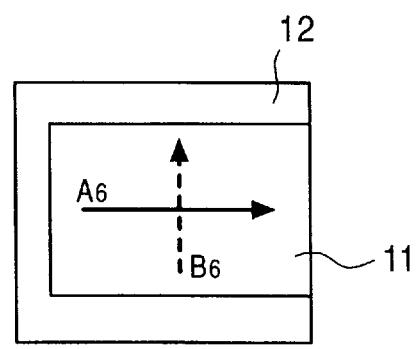
Figure 6D:
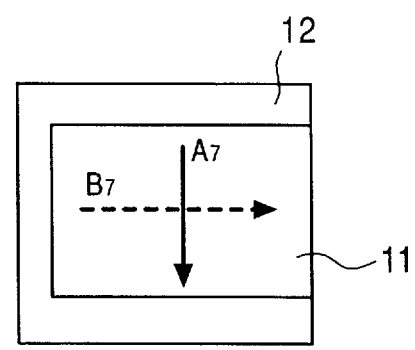

FIG. 6A shows an example in which, upon setting rubbing directions parallel or perpendicular to the sides of the substrates 11 and 12, the rubbing direction of the alignment film 27 on the upper substrate side is set as indicated by arrow $A_4$ (in a leftward direction as viewed in the normal viewing direction to the substrates) and the rubbing direction of the alignment film 26 on the lower substrate side is set as indicated by arrow $B_4$ (in a downward direction as viewed in the normal viewing direction to the substrates). FIG. 6B shows an example in which rubbing directions are set by turning the two rubbing directions of FIG. 6A clockwise by 90° (as directions $A_5$ and $B_5$), FIG. 6C shows an example in which rubbing directions are set by turning the two rubbing directions of FIG. 6B clockwise by 90° (as directions $A_6$ and $B_6$), and FIG. 6D shows an example in which rubbing directions are set by turning the two rubbing directions of FIG. 6C clockwise by 90° (as directions $A_7$ and $B_7$).

As shown in FIGS. 5 and 6, the rubbing directions of the upper and lower alignment films 26 and 27 can be set variously without any conflict with conditions for achieving the object of the invention.

A condition common to all the rubbing directions shown in FIGS. 4, 5 and 6 is that the liquid crystal molecules existing between the upper and lower substrates are twisted by 90° between the upper and lower substrates. Preferably, the rubbing directions of the alignment films 26 and 27 are set so that, if the major axes of the liquid crystal molecules arranged along the rubbing direction of the lower substrate side are turned clockwise by 90° as viewed in the normal direction to the substrate, the direction of the major axes of the liquid crystal molecules coincides with the rubbing direction of the upper substrate.

In the examples shown in FIGS. 4, 5 and 6, only the rubbing directions set at 0°, 45°, 90°, 135°, 180°, 225°, 270°, and 315° as angles of rotation about the centers of the substrates are shown. However, rubbing directions at any other angles are possible as long as they are such that the liquid crystal molecules existing between the upper and lower substrates are twisted by 90° between the upper and lower substrates, or that, if the major axes of the liquid crystal molecules arranged along the rubbing direction of the lower substrate side are turned clockwise by 90° as viewed in the normal direction to the substrate, the direction of the major axes of the liquid crystal molecules coincides with the rubbing direction of the upper substrate.

Figure 7:
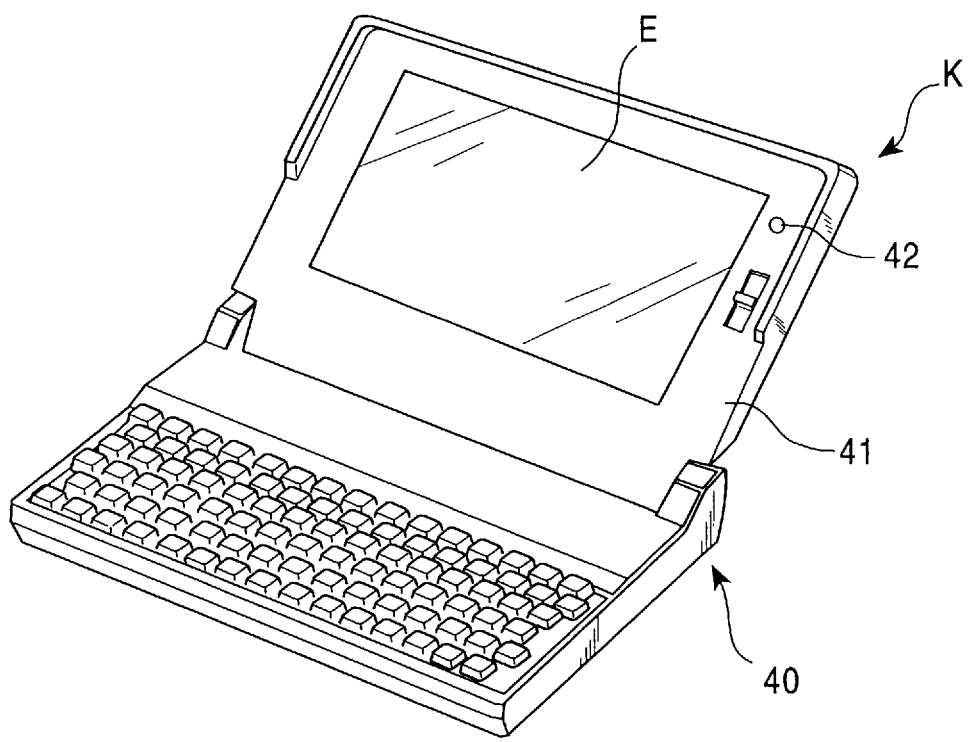
FIG. 7 is a perspective view of an electronic apparatus having a liquid crystal display in accordance with the present invention.

FIG. 7 shows an example of an electronic apparatus K having the liquid crystal display E in accordance with the present invention. In this example, the liquid crystal display E is incorporated in a cover board 41 constituting a body 40 of a note type personal computer.

The liquid crystal display E has the structure described above with reference to FIGS. 1 to 4. A switch (changing means) 42 of a button type or the like having the function of connecting or disconnecting the black matrix 22 and the common electrode 18 is provided in an inner top right-hand portion of a lid member 41. The liquid crystal display E can easily be changed between a wide viewing angle state and a narrow viewing angle state by operating the switch 42.

In this electronic apparatus K, in a situation where an information items relating to one's privacy or a secret, of which prevention from being seen by those around a user is preferred, is being displayed, the liquid crystal display E is set in the narrow viewing angle state by operating the switch 42. Conversely, if it is preferred that the display can be viewed in a wide range of angles in every direction, the switch is changed to set the display in the wide viewing angle state. Thus, the display can be used in one of the two different states according to a situation.

While use of the liquid crystal display E in a note type personal computer has been described, the present invention can of course be applied to any electronic apparatus ordinarily using a liquid crystal display other than note type personal computers. Needless to say, the present invention can be widely applied to other various apparatuses, e.g., a cash dispenser having a liquid crystal display, a copying machine, facsimile machine, a fixed telephone set having a liquid crystal push button, a portable telephone set, and a liquid crystal touch panel for a cash box.

EXAMPLES

A black matrix made of Mo and having through holes such as those shown in FIG. 2 (having a size of 30 $\mu$m×12 $\mu$m) was formed on a glass substrate. A gate wiring, thin film transistors, transparent pixel electrodes made of ITO, a source wiring and so on were formed over the black matrix with a silicon nitride interlayer insulating film interposed between the black matrix and the other elements. Further, a polyimide alignment film was formed and was rubbed with a rubbing roll in the direction B shown in FIG. 4, thereby forming a planar thin film transistor array as shown in FIG. 2. On another glass substrate, a color filter, a common electrode made of ITO, and a polyimide alignment film were formed. This alignment film was rubbed with a rubbing roll in the direction A shown in FIG. 4. A TN mode liquid crystal was enclosed between the two glass plates, thus making a liquid crystal display.

A conductor portion led out from the common electrode was formed on an end portion of the corresponding one of the glass substrates, and a conductor portion led out from the black matrix was formed on an end portion of the other glass substrate. The two conductor portions were connected to each other by Ag paste electrodes between which a switch was interposed. The liquid crystal display of this construction was manufactured by setting the width and length of the pixel electrodes to 34 $\mu$m and 125 $\mu$m, respectively.

Figure 8:
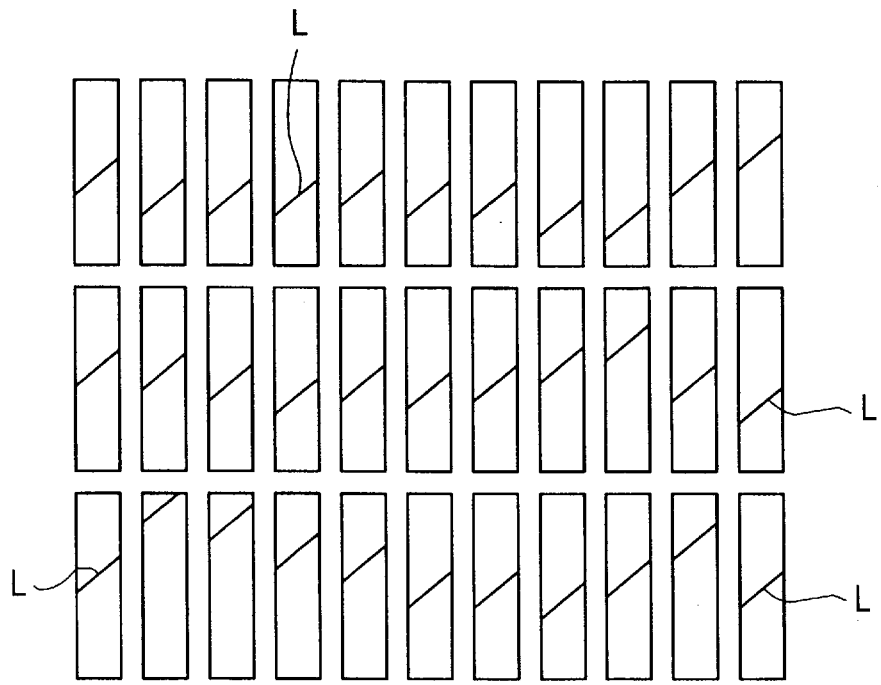
FIG. 8 is a schematic plan view of two-domain regions formed on the pixel electrodes of the liquid crystal display in accordance with the present invention, showing discrimination lines at which the regions are divided.

FIG. 8 schematically shows the results of optical-microscopic photography of discrimination lines corresponding to the boundaries between domains formed in the pixels in the obtained liquid crystal display when the liquid crystal display was driven by applying a voltage Vseg of 5.5 V to the pixel electrodes and by setting the common electrode and the black matrix at the ground potential, i.e., 0 V.

As shown in FIG. 8, formation of a discrimination line L inclined by about 45° in each longitudinal rectangular pixel could be recognized, and it was confirmed that each pixel was separated into two domains.

On the other hand, when the liquid crystal display was driven by applying a voltage Vseg of 5.5 V to the pixel electrodes, by setting the common electrode at the ground potential, i.e., 0 V, and by setting the black matrix in the floating state, each pixel had one domain and no discrimination line was observed.

Viewing angle characteristics of the obtained liquid crystal display were evaluated by the Iso-REC method (REC: acronym of reverse-image, excessively-dark-image/bright-image, contrast ratio).

The Iso-REC method will be described briefly below.

Figure 9:
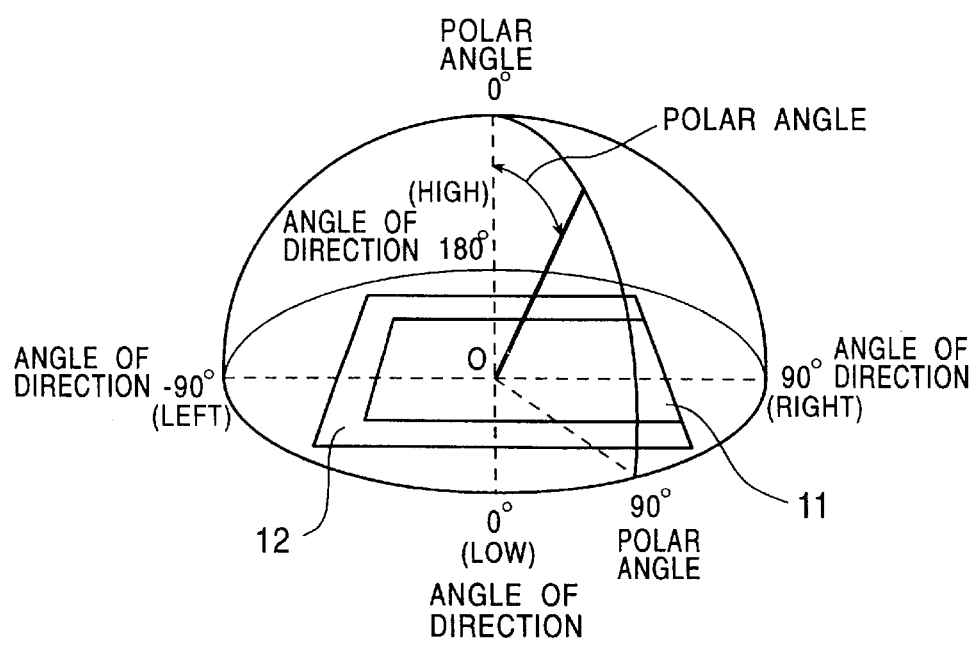
FIG. 9 is a diagram of a polar coordinate system used to evaluate the viewing angle of the liquid crystal display.

The Iso-REC method is a kind of method using a quantification system described below. A hemisphere centered on an origin O corresponding to the center of the substrate 12 as shown in FIG. 9 is assumed. Then, the direction from the nearest and lowest point on the hemisphere as viewed in FIG. 9 to origin O parallel to the vertical axis of the substrate 12 can be represented by a 0° low angle; the direction from right and parallel to the horizontal axis of the substrate 12 can be represented by a 90° right angle; the direction from the furthest point as viewed in FIG. 9 can be represented by a 180° high angle; and the direction from left can be expressed as a −90° left angle. This system enables the display state of the liquid crystal screen to be expressed by being related to different points on the hemisphere from which the screen is viewed.

In viewing the screen of the TN mode thin film transistor liquid crystal display in different directions, a normal display state is observed when the display is viewed from a point in front of the screen, but a display state low in contrast ratio on the average, referred to as "whitening" display (excessively-bright-image), is observed when the display is viewed form a high position. Also, a "solid dark" display state (excessively-dark-image) low in brightness on the average is observed from a lower position at a small incident angle. If the incident angle is increased, a display state in which dark and bright portions are reversed (reversal; reverse-image) is observed. The method of quantifying these "whitening", "solid dark" and "reversal" and showing distributions of them is known as Iso-REC method.

Figure 10:
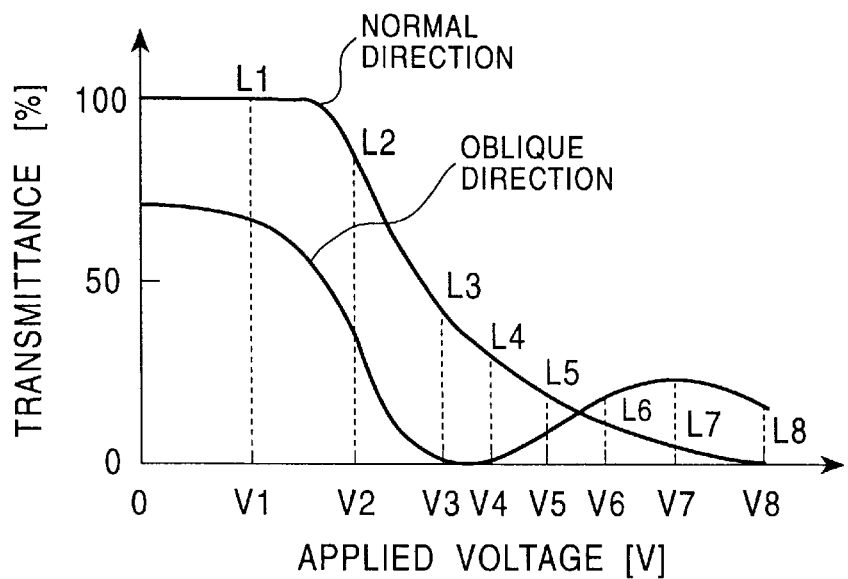
FIG. 10 is a diagram showing the relationship between the applied voltage and the transmittance in an ordinary normally white type liquid crystal display.
Figure 11:
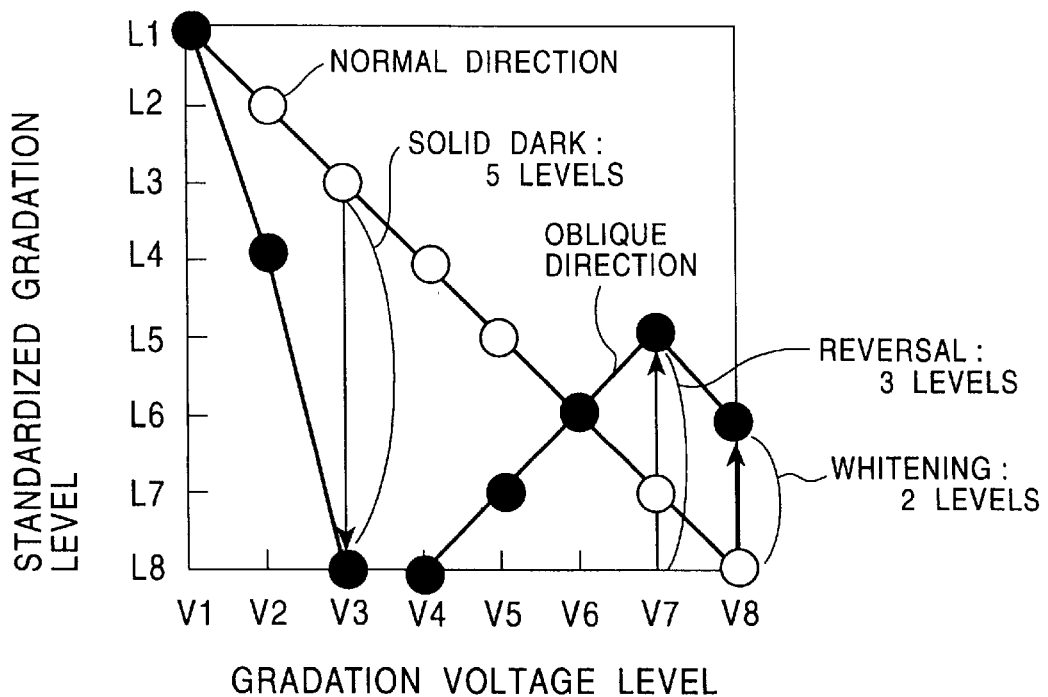
FIG. 11 is a diagram showing gradation voltage levels and standardized gradation levels in the liquid crystal display relating to FIG. 10.

FIG. 10 shows an example of electrooptical characteristics of a TN liquid crystal liquid crystal display having a normally white mode. Referring to FIG. 10, different transmittance curves are exhibited with respect to the normal direction perpendicular to the display screen and an oblique direction. In the range of voltages V1 to V6, the transmittance in the oblique direction is lower than that in the normal direction. Conversely, when the applied voltage is higher than V6, the transmittance in the oblique direction is higher. The relationship shown in FIG. 11 is obtained by standardizing the transmittance values relative to the maximum transmittance in each direction to obtain standardized gradation levels, and by plotting the standardized gradation levels with respect to gradation voltage levels V1 to V8.

For example, when voltage V3 is applied, a level L8 is obtained with respect the oblique direction while a standardized gradation level L3 is obtained with respect to the normal direction, that is, the brightness is lower in the oblique direction than in the normal direction. The result of observation in the oblique direction in this case can be determined as "solid dark". The amount of solid dark is defined by the change from the gradation level L3 to the gradation level L8, i.e., the difference of five levels between the levels L3 and L8. With respect to all the gradation levels L1 to L8, levels representing the amount of solid dark are counted, and the maximum of the counted values is set as the amount of solid dark at the particular angle.

On the other hand, the same calculation is performed to determine "whitening". For example, on gradation voltage level V8, the standardized brightness level with respect to the oblique direction is 6, higher than the standardized brightness level of 8 with respect to the normal direction. In this case, "whitening" is recognized, the amount of which is two levels. "Reversal" is recognized when, after the standardized gradation level has decreased to a minimum value with an increase in gradation voltage level, it increases from the minimum value. The amount of reversal is represented by the maximum amount by which the gradation level increases from the minimum value. In this case, it is three levels.

As described above, the different kinds of display abnormalities can be quantified separately from each other, and the values of the abnormalities can be shown in the viewing angle polar coordinate system.

Figure 12:
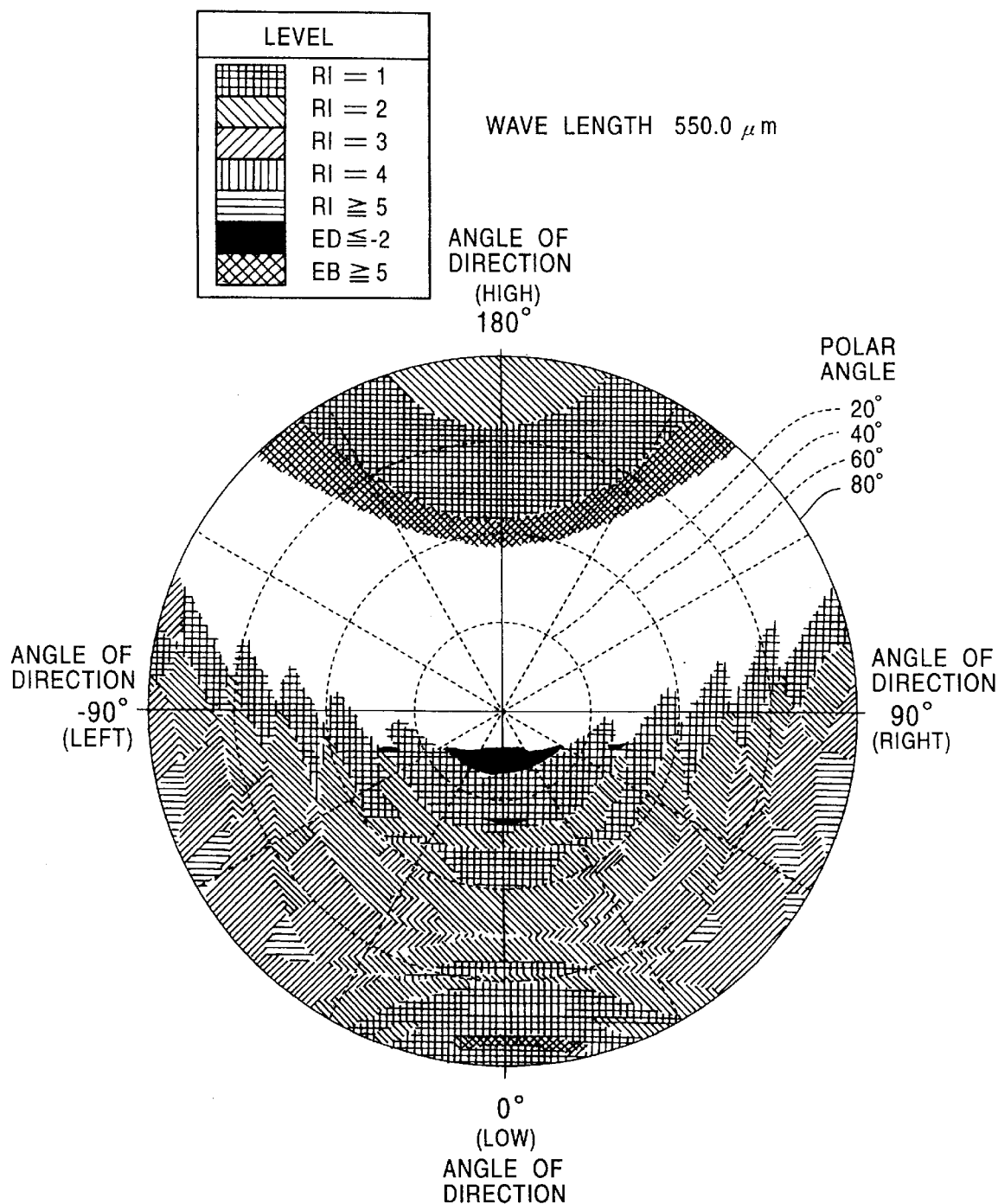
FIG. 12 is a diagram showing, in the polar coordinate system, display states of the liquid crystal display of the present invention determined by the Iso-REC method when the black matrix and the common electrode are in a floating state and in a grounded state, respectively.

FIG. 12 shows, in the polar coordinate system, a normal display area and abnormal display areas on the liquid crystal display having the structure shown in FIG. 1 and manufactured as described above. These areas were determined by the Iso-REC method when the switch was turned off to maintain the common electrode and the black matrix in the disconnected state. In FIG. 12, "whitening" is represented by EB, "solid dark" by ED, and "reversal" by RI. In FIG. 12, each of the grid pattern area of RI=1, the hatched areas of RI=2, 3, the vertically hatched area of RI=4 and the horizontally hatched area of RI=5 indicates "reversal", each numeral representing the magnitude of reversal. The solid black area designated by ED indicates "solid dark", the net pattern area designated by EB indicates "whitening", and the blank area represents the normal display area.

As is apparent from FIG. 12, in the liquid crystal display in which the black matrix is in the floating state and was not equal in potential to the common electrode, a solid dark area was observed at a small low-position angle, and the viewing angle was considerably restricted generally in ranges of low-position angles.

Figure 13:
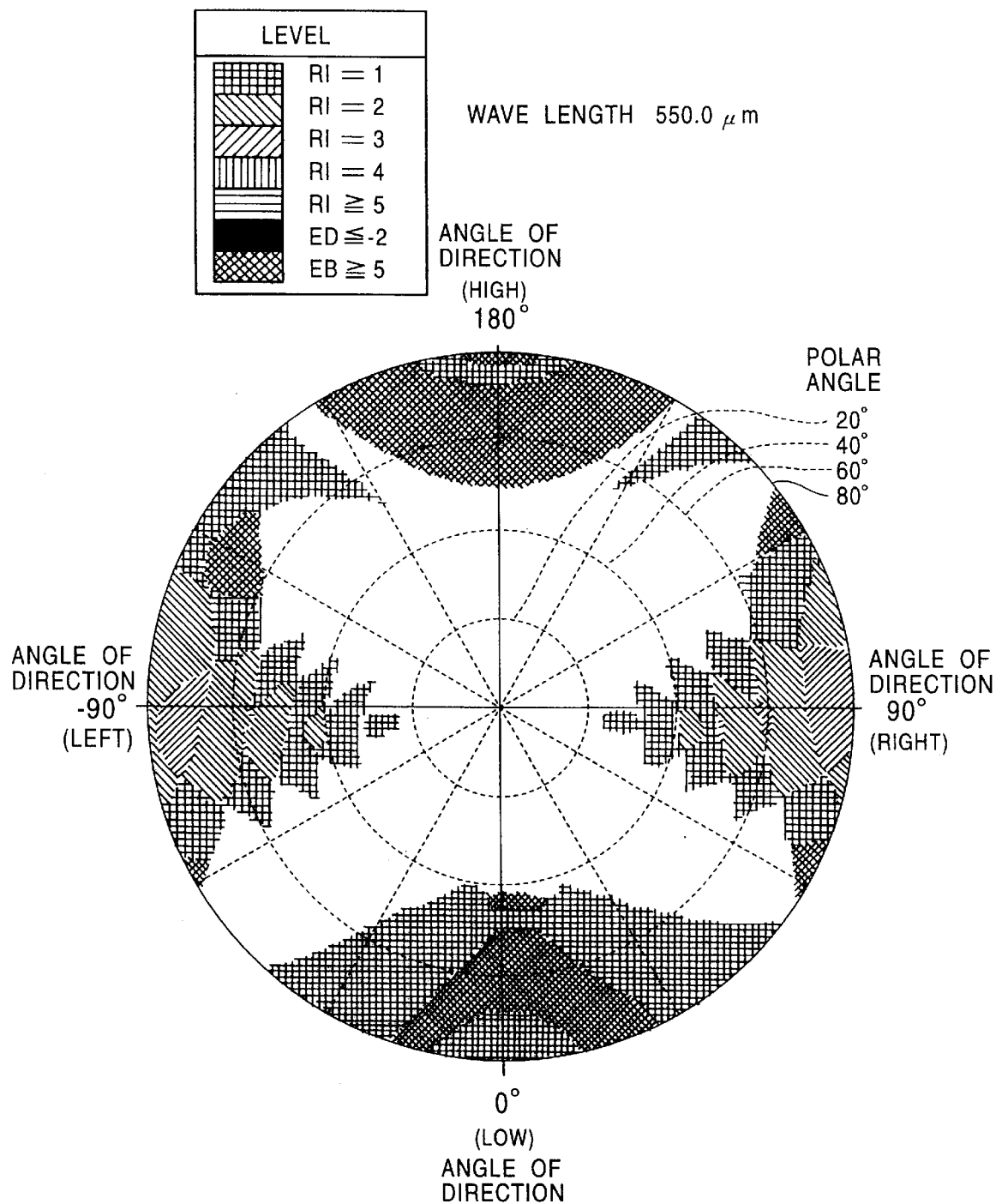
FIG. 13 is a diagram showing, in the polar coordinate system, display states of the liquid crystal display of the present invention determined by the Iso-REC method when each of the black matrix and the common electrode is in a grounded state.

FIG. 13 shows, in the polar coordinate system, the results of determination by the Iso-REC method of a normal display area and abnormal display areas on the liquid crystal apparatus in which the black matrix and the common electrode were connected to each other by the switch to be maintained at the same potential.

As is apparent from comparison between FIGS. 12 and 13, if the black matrix and the common electrode are connected to be maintained at the same potential, the normal display area extends largely with respect to lower positions from which the display is viewed, and the viewing angle is correspondingly increased. No solid dark area appears with respect to lower viewing positions, and the reversal area is largely reduced. Further, the degree of whitening with respect to higher viewing positions is reduced.

Figure 14:
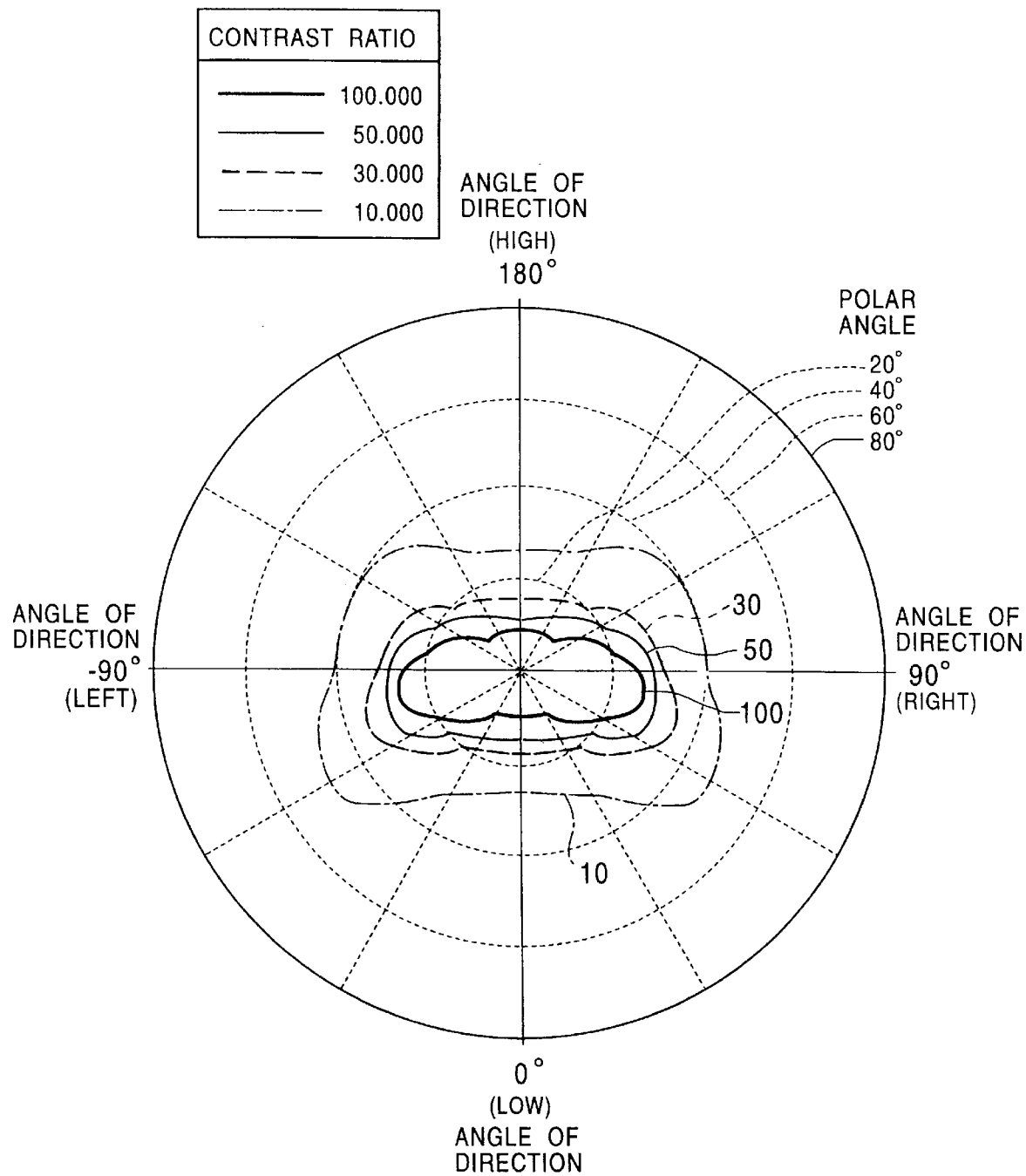
FIG. 14 is a diagram showing equicontrast curves in the liquid crystal display of the present invention when each of the black matrix and the common electrode is in a grounded state.

FIG. 14 shows equicontrast curves in the liquid crystal apparatus in the state where the black matrix and the common electrode were connected to each other. Typical equicontrast curves of the two domain type were observed. That is, the equicontrast curves shown in FIG. 14 can be considered to be obtained by combining two kinds of viewing angle characteristics.

As described above, it has been confirmed that the display could be changed as desired between the narrow viewing angle state and the wide viewing angle state by operating the switch.

Figure 15:
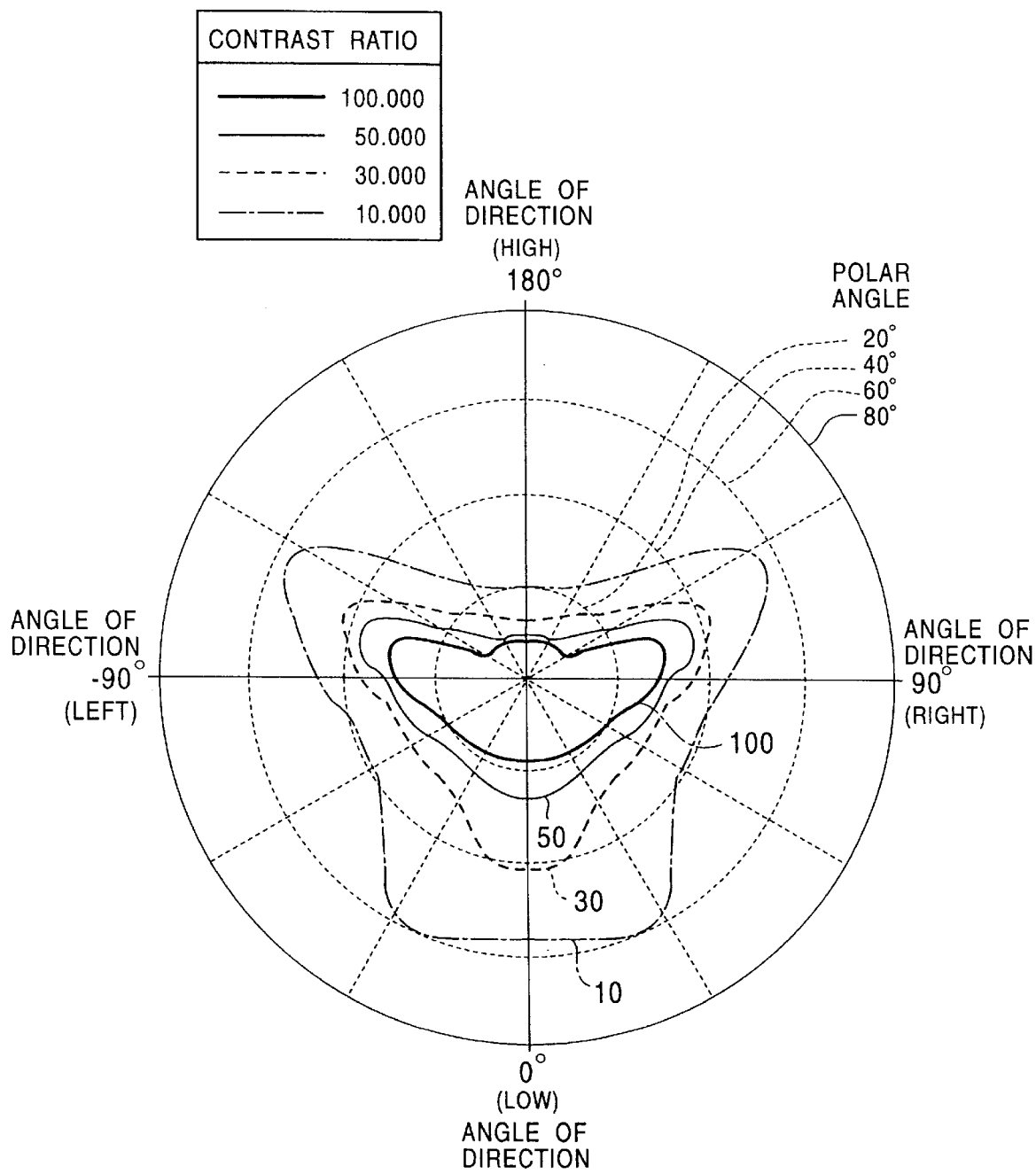
FIG. 15 is a diagram showing equicontrast curves in the liquid crystal display when the black matrix is in a floating state.
Figure 16:
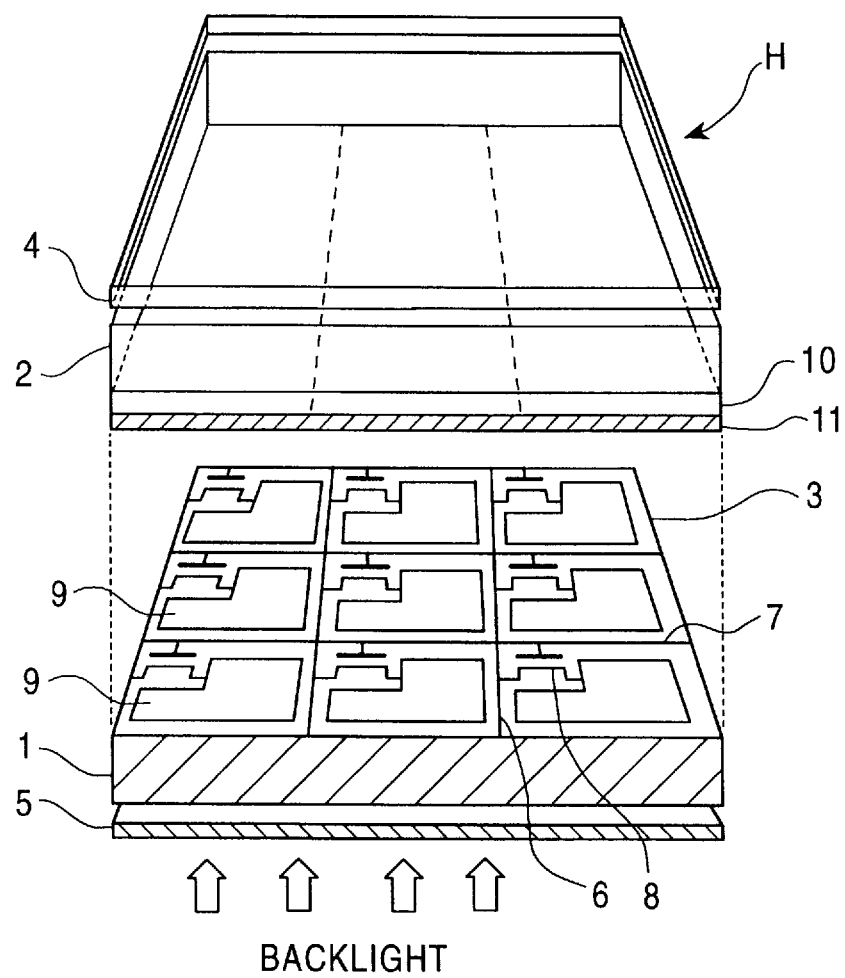
FIG. 16 is an exploded perspective view of an example of a conventional TN mode liquid crystal display.
Figure 17:
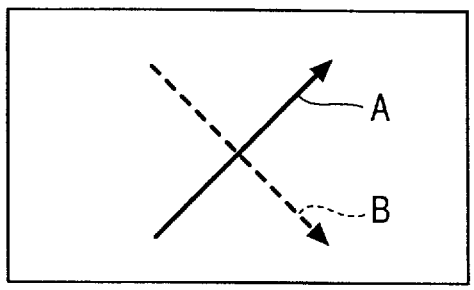
FIG. 17 is a diagram showing rubbing directions of the conventional TN mode liquid crystal display.

FIG. 15 shows equicontrast curves in the liquid crystal apparatus in the state where the potential of the black matrix was not controlled (in the floating state). It is apparent that the same characteristics as those of the conventional TN mode liquid display apparatus were obtained.

As described above, in the liquid display apparatus in accordance with the present invention, changing means enables the display to be changed to select one of the one-domain pixel region and the two-domain pixel region, thus making it possible to easily change the display between the wide viewing angle state and the narrow viewing angle state.

The black matrix and the common electrode are connected to each other by the changing means, and the black matrix and the common electrode can easily be changed by the changing means between the state of being connected and maintained at the same potential and the disconnected state, thereby enabling the display to be changed between the wide viewing angle state and the narrow viewing angle state.

Further, the black matrix and the common electrode may be electrically connected by a switch to enable the black matrix and the common electrode to be disconnected from each other if there is a need to use the display in such a state that display contents cannot easily be recognized with the eye from peripheral positions, as well as to enable the black matrix and the common electrode to be electrically connected to each other if there is a need to view display contents in a wide range of angles from peripheral positions.

The above-described structure may be realized in such a manner that the liquid crystal is a TN mode liquid crystal, the rubbing direction of the alignment film provided on one of the two substrates and the rubbing direction of the alignment film provided on the other substrate are in a 90° twisted state, and that the rubbing direction of the alignment film on the other of the two substrates is 90° twisted clockwise relative to the rubbing direction of the alignment film provided on the above-mentioned one of the substrates, thus realizing the structure for reliably changing the display between the wide viewing angle state and the narrow viewing angle state.

In the electronic apparatus having changing means, the wide viewing angle state and the narrow viewing angle state can be freely changed by operating the changing means. Thus, the invention makes it possible to provide an electronic apparatus which can easily be adapted, by operating an switch, to use in a case where there is a need to make display contents not easily recognizable with the eye from peripheral positions, as well as to use in a case where there is a need to view display contents in a wide range of angles from peripheral positions.

What is claimed is:

1. A liquid crystal display comprising:

a pair of substrates having respective surfaces opposed to each other;

a liquid crystal provided between said pair of substrates;

a common electrode and an alignment film successively formed on the opposed surface of one of said substrates;

a multiplicity of pixel electrodes provided on the opposed surface of the other of said substrates so as to cover display regions of said liquid crystal;

an electroconductive black matrix provided on the other of said substrates while being electrically insulated from said pixel electrodes, said black matrix being formed at peripheral portions of said pixel electrodes and over non-display regions of said liquid crystal;

another alignment film provided over said pixel electrodes and said black matrix; and changing means for dividing a pixel region formed corresponding to each of said multiplicity of pixel electrodes into two when said changing means applies a potential to said black matrix, said changing means changing the two pixel regions formed corresponding to each of said multiplicity of pixel electrodes into one when said changing means applies no potential to said black matrix.

2. A liquid crystal display of claim 1 wherein said black matrix and said common electrode are electrically connected to each other by said changing means.

3. A liquid crystal display of claim 1 wherein a potential can be applied to said black matrix and said common electrode freely selectively to maintain said black matrix and said common electrode in an equipotential state.

4. A liquid crystal display of claim 1 wherein said liquid crystal comprises a TN mode liquid crystal; the rubbing direction of said alignment film provided on said one of said substrates and the rubbing direction of said alignment film provided on the other of said substrates are in a 90° twisted state; and the rubbing direction of said alignment film on the other of said substrates is set in accordance with one direction while the rubbing direction of said alignment film on said one of said substrates is set so that the rubbing direction of said alignment film on the other of said substrates is 90° twisted clockwise relative to the rubbing direction of said alignment film on said one of said substrates.

5. An electronic apparatus comprising:

a pair of substrates having respective surfaces opposed to each other;

a liquid crystal provided between said pair of substrates;

a common electrode and an alignment film successively formed on the opposed surface of one of said substrates;

a multiplicity of pixel electrodes provided on the opposed surface of the other of said substrates so as to cover display regions of said liquid crystal;

an electroconductive black matrix provided on the other of said substrates while being electrically insulated from said pixel electrodes, said black matrix being formed at peripheral portions of said pixel electrodes and over non-display regions of said liquid crystal;

another alignment film provided over said pixel electrodes and said black matrix; and changing means for dividing a pixel region formed corresponding to each of said multiplicity of pixel electrodes into two when said changing means applies a potential to said black matrix, said changing means changing the two pixel regions formed corresponding to each of said multiplicity of pixel electrodes into one when said changing means applies no potential to said black matrix.

6. An electronic apparatus of claim 5 wherein said black matrix and said common electrode are electrically connected to each other by said changing means.

7. An electronic apparatus of claim 5 wherein a potential can be applied to said black matrix and said common electrode freely selectively to maintain said black matrix and said common electrode in an equipotential state.

8. An electronic apparatus of claim 5 wherein said liquid crystal comprises a TN mode liquid crystal; the rubbing direction of said alignment film provided on said one of said substrates and the rubbing direction of said alignment film provided on the other of said substrates are in a 90° twisted state; and the rubbing direction of said alignment film on the other of said substrates is set in accordance with one direction while the rubbing direction of said alignment film on said one of said substrates is set so that the rubbing direction of said alignment film on the other of said substrates is 90° twisted clockwise relative to the rubbing direction of said alignment film on said one of said substrates.

* * * * *

UNITED STATES PATENT AND TRADEMARK OFFICE
CERTIFICATE OF CORRECTION

PATENT NO. : 5,870,158
DATED : February 9, 1999
INVENTOR(S) : Akira Abe et al.

It is certified that error appears in the above-identified patent and that said Letters Patent is hereby corrected as shown below:

On the Title Page

In column 1, Item [73] change "Alps Electric Co., Ltd.," to --Front Incorporated--.

Signed and Sealed this

Twenty-third Day of May, 2000

Attest:

Q. TODD DICKINSON

*Attesting Officer*  *Director of Patents and Trademarks*